(12) United States Patent
Asplund et al.

(10) Patent No.: US 8,044,297 B2
(45) Date of Patent: Oct. 25, 2011

(54) GROUND ELECTRODE

(75) Inventors: Gunnar Asplund, Ludvika (SE); Gunnar Flisberg, Ludvika (SE); Lars Weimers, Ludvika (SE); Jan Lundquist, Ludvika (SE); Urban Åström, Saxdalen (SE); Dan Karlsson, Sundsvall (SE)

(73) Assignee: ABB Technology Ltd., Zürich (CH)

( * ) Notice: Subject to any disclaimer, the term of this patent is extended or adjusted under 35 U.S.C. 154(b) by 295 days.

(21) Appl. No.: 11/992,238

(22) PCT Filed: Sep. 19, 2005

(86) PCT No.: PCT/SE2005/001368
§ 371 (c)(1),
(2), (4) Date: Aug. 10, 2009

(87) PCT Pub. No.: WO2007/035133
PCT Pub. Date: Mar. 29, 2007

(65) Prior Publication Data
US 2009/0301747 A1    Dec. 10, 2009

(51) Int. Cl.
*H01R 4/66* (2006.01)
(52) U.S. Cl. .................... 174/6; 174/51; 174/7; 174/78; 204/196.36
(58) Field of Classification Search .................. 174/6, 7, 174/51, 70 R, 70 S, 101.5, DIG. 2, 135, 138 R, 174/68.1, 68.3, 101, 78; 204/196.01, 280, 196.36; 439/92
See application file for complete search history.

(56) References Cited

U.S. PATENT DOCUMENTS

| | | | | |
|---|---|---|---|---|
| 4,175,021 A | * | 11/1979 | Tatum et al. | 204/196.36 |
| 4,401,540 A | * | 8/1983 | Tatum et al. | 204/196.36 |
| 5,910,236 A | * | 6/1999 | Iossel et al. | 204/280 |
| 6,242,688 B1 | * | 6/2001 | Iossel et al. | 174/6 |
| 6,245,989 B1 | | 6/2001 | Iossel et al. | |

FOREIGN PATENT DOCUMENTS

| | | |
|---|---|---|
| DE | 4443745 A1 | 9/1996 |
| RU | 2240633 C1 | 11/2004 |
| SU | 1267527 A2 | 10/1986 |
| WO | WO 98/19364 | 5/1998 |

OTHER PUBLICATIONS

PCT/ISA/210—International Search Report—Mar. 20, 2006.

* cited by examiner

*Primary Examiner* — Angel R Estrada
(74) *Attorney, Agent, or Firm* — Venable LLP; Eric J. Franklin

(57) ABSTRACT

A land electrode for a high voltage direct current transmission system including a converter station with a grounding point. The land electrode is connected to the grounding point and includes a plurality of electrode sections. A line electrode includes a part interconnecting two electrode sections. The part of the line electrode exhibits a line resistance. Each electrode section includes at least one electrode element.

10 Claims, 2 Drawing Sheets

GROUND ELECTRODE

TECHNICAL FIELD

The present invention concerns a system for transmission of high voltage direct current (HVDC). More precisely the invention concerns grounding of a HVDC system. Especially the invention concerns a grounding electrode and a method for grounding a HVDC system Ground electrodes, in this context, means devices used to connect a grounding point of a HVDC transmission system to earth. The ground electrodes may comprise one or more feeder cables, to a conducting medium such as soil or sea water.

BACKGROUND OF THE INVENTION

In comparison with an alternating current (AC) transmission system a HVDC transmission system requires only two conductors. At least one of those conductors must be isolated from earth. Hence, one of the conductors may be implemented as an overhead line or a high voltage cable. The other conductor may implement the use of earth or ground as the conducting medium. For bipolar transmission another conductor of the same kind is used under normal operating conditions. However, a ground conductor is required to transfer unbalance currents. The bipolar HVDC transmission system must also be capable of working as a monopole HVDC transmission system. During such operation the ground conductor transmits the whole DC current transmitted by the HVDC transmission system.

A HVDC transmission system comprises a first converter station connected to a first AC transmission network, a second converter station connected to a second AC transmission network and at least two conductors connecting the first and second converter station. Each converter station contains a grounding point connected to a ground electrode for making electric contact with earth. Thus the ground conductor comprises the ground electrode at each converter station and the ground between the two ground electrodes.

A bipolar HVDC transmission system conventially comprises a pair of overhead conductors carried by a plurality of towers from the first converter station to the second converter station. The conductors are suspended in isolators from arms of the towers. Each tower also caries shield conductors for protection of thunder lightning. Commonly the distance between two adjacent towers is around 400 m. Each tower is grounded to earth.

The ground electrode comprises a plurality of electrode elements for making electric contact with the ground. The ground is normally soil and/or sea water. Hence, the ground electrode may comprise a land electrode or a sea electrode. The electrodes operate as anodes, that is, delivering current to the conducting medium, or as cathodes, that is, receiving current from the medium.

A land electrode in this context is a ground electrode located in soil. The land electrode transfers the DC current from the HVDC transmission system to the soil or vice versa. The soil, in this context, is generally to be regarded as a conducting, however, inhomogeneous medium.

The land electrodes are, apart from the requirements as to current and resistance, also required to be electrically safe, to have high operational reliability and sufficiently long service life, and in addition, not to cause any harmful environmental effects, such as for instance drying up of the soil in the vicinity of the electrode.

In order to reach a sufficiently low grounding resistance, the land electrode usually comprises a large number of electrode element arranged in a tree structure. Hence, each electrode element is connected to the grounding point via a feeder conductor, a sub-feeder conductor and a plurality of further sub-feeder conductors. The aim is that the current flow shall spread evenly from the grounding point to each electrode element. In order to reach this aim each electrode element must have an equally long connection path the grounding point. Hence, every electrode element is connected as if they were connected to the grounding point in parallel.

In a known ground electrode arrangement the land electrode is connected to the grounding point of the converter station by a one or more feeder cables. Each sub-electrode is fed from a separate sub-electrode feeder cable. A sub-electrode comprises a backfill and an active electrode element embedded in the backfill. Most usually the backfill comprises a bed of coke. The electrode element is in electric contact with the sub-electrode feeder cable and comprises an active part of its surface which is in electric contact with the backfill. In cases where the sub-electrode comprises more than one such electrode element, these elements are coupled to each other by interconnection cables.

The backfill occupies a considerable volume around the electrode element and is in its turn embedded in the soil. The active part of the surface of the backfill is that part of its surface which is in electric contact with the soil.

From U.S. Pat. No. 6,245,989 (Iossel) a land electrode for high voltage direct current transmission system is previously known. The object of the land electrode is to improve the rate of dissolution of the feeding elements, and to improve the lifetime and reliability of the electrode. Hence the land electrode according to Iossel contains electrode elements separated from each other by electrically non-conducting element barriers.

A land electrode comprising sub-electrodes, sections and sub-sections may occupy a considerable piece of land. In a commonly known circular arrangement the diameter may be in the range of 500 to 1000 meter. Normally the land electrode is located distant from the converter station because the flow of DC current may harm the function of a nearby positioned transformer. A considerable piece of land is also occupied by the converter station and by the power lane containing the towers carrying the conductors between the converter stations.

SUMMARY OF THE INVENTION

An object of the present invention is to seek ways to provide an optional land electrode for a HVDC transmission system.

This object is achieved according to the invention by a land electrode or by a method.

According to the invention the land electrode comprises a plurality of electrode sections connected to a line electrode. Each section comprises at least one or a plurality of parallel connected electrode elements and a tuning resistor for connection to the line electrode. Hence, by tuning the individual tuning resistors the difference in resistance between the sections is compensated such that the current will be spread evenly to each electrode element. Preferably the line electrode is arranged along the line of towers.

In an embodiment of the invention the section comprises a tower and the electrode elements the tower grounding. In a further embodiment the line electrode comprises a conductor isolated supported on the towers. In another embodiment the line electrode comprises a cable which is isolated from the ground. In a further embodiment the electrode sections comprise traditionally arranged electrode elements. In an embodiment of the invention the land electrode comprises the tower grounding of a plurality of adjacent towers. In another embodiment the land electrode comprises bundles of towers arranged apart from each other. In one embodiment of the invention the line electrode comprises at least two conductors, each connected to an equal number of tower groundings.

According to the invention any number of tower groundings may be used as well as the choice of any tower position along the line electrode. The line electrode may be made very long, typically about 100 km. This is favorable compared to conventional electrodes that are normally circular with a diameter of maximum 1000 m. A line electrode can be utilized at one or both ends of a HVDC-transmission link.

In a first aspect of the invention the object is achieved by a land electrode for a HVDC transmission system comprising a plurality of electrode sections, each electrode section comprising a plurality of electrode elements, wherein the land electrode comprises a line electrode and each electrode section comprises a tuning resistor for connection to the line electrode.

In a second aspect of the invention the object is achieved by a method for grounding a HVDC transmission system, comprising;
  providing a plurality of electrode sections containing electrode elements,
  providing for each electrode section a tuning resistor,
  connecting the electrode sections in series along a line electrode, and
  tuning the tuning resistor to equal current in each section.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Figure 1:
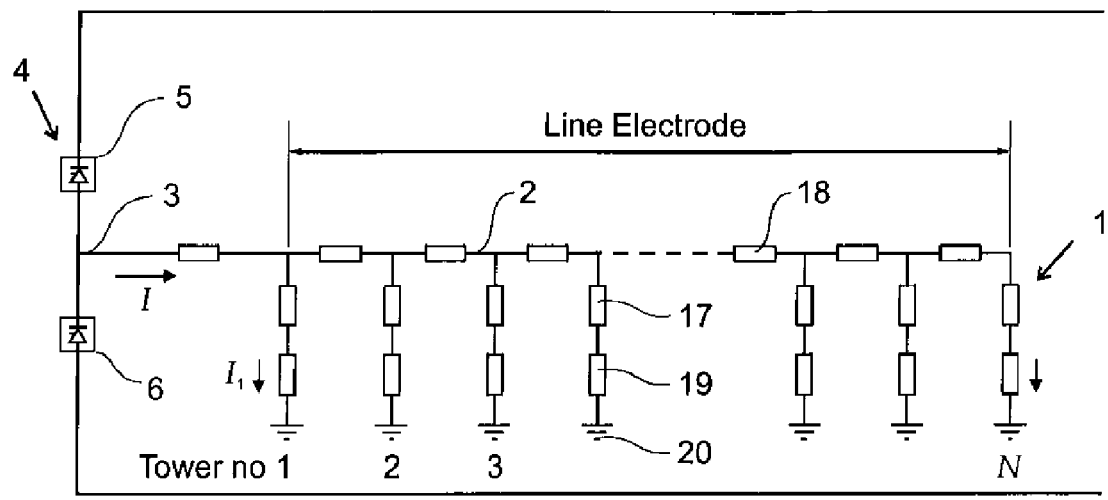
FIG. 1 is a principal circuit of a land electrode comprising a line electrode and a plurality of electrode sections according the invention.
Figure 2:
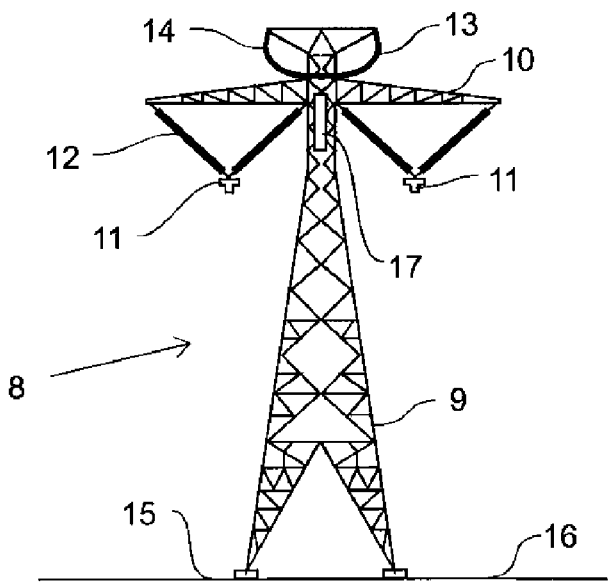
FIG. 2 is a principal design of a tower for carrying the HVDC transmission lines.

Referring to FIG. 1a land electrode according to the invention comprises a plurality of electrode sections 1 connected to a line electrode 2. The land electrode is connected to a grounding point 3 of a converter station 4. The converter station comprises one end of a HVDC transmission system (not shown). The converter station comprises a first converter bridge 5 and a second converter bridge 6 and is arranged for bipolar operation. Each electrode section comprises a tuning resistor 17. The electrode sections also comprises electrode elements 20, schematically indicated with an earth symbol, for connection to earth In the embodiment shown in FIG. 1 each electrode section 1 may comprise a line tower 8 as shown in FIG. 2. The tower comprises a vertical body 9 and an arm construction 10 for carrying the HVDC transmission lines 11. The transmission lines are suspended in isolators and in the embodiment shown the transmission lines comprise three wires in a triangular arrangement. On top of the tower is two line electrodes 13 suspended from isolators 14. The tower comprises a grounding system containing a grading ring 15 and a tower foot earthing 16. The tower contains the tuning resistor 17 connecting the tower grounding system with the line electrodes. On top the tower comprises a pair of shield wires (not shown) for thunder lightening protection.

As indicated in FIG. 1 the line electrode exhibits a line resistance 18 between each tower. Also indicated in FIG. 1 are the electrode sections in the form of a tower having an earth resistance 19. As also indicated in FIG. 1 the line electrode may connect adjacent towers as well as a first group of tower (the four on the left side of the figure) and second group of towers (the three on the right-hand side of the figure).

The tuning resistor is required in each tower of the line electrode to provide for an even current distribution among the tower earthings. Touch voltages have to be reduced by conventional protective grading rings in the ground at the towers. A substantial reinforcement of the earth wires of the tower earthing is required due to the corrosion caused mainly by the small unbalance current in bipolar operation over long time. The earth wires of the tower earthings should have continuous counterpoises or radial counterpoises of copper wires of relatively large cross section, for example 2×150 mm2.

Figure 3:
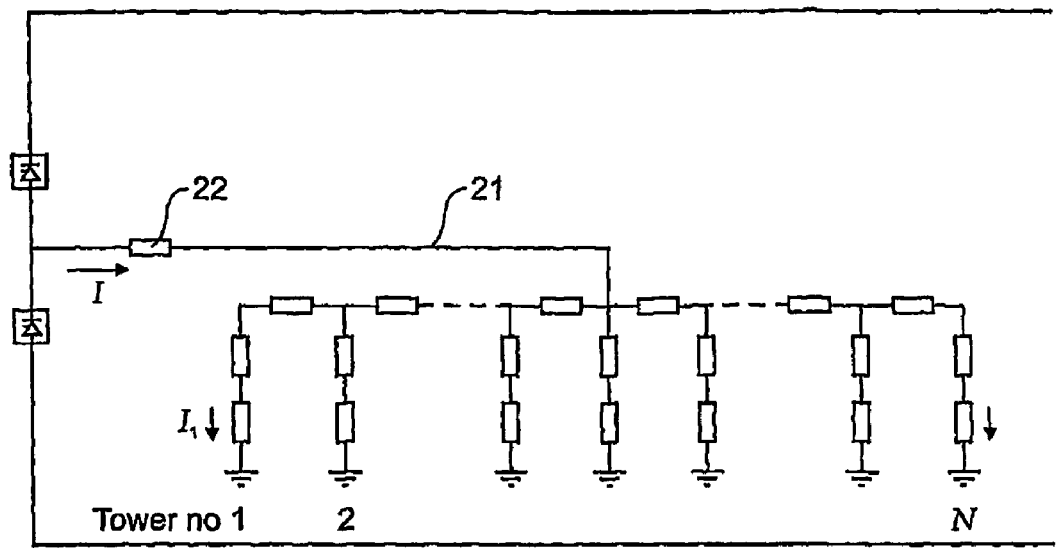
FIG. 3 is a principal circuit of a land electrode comprising a plurality of electrode sections and a line electrode in a mid point connection arrangement.
Figure 4:
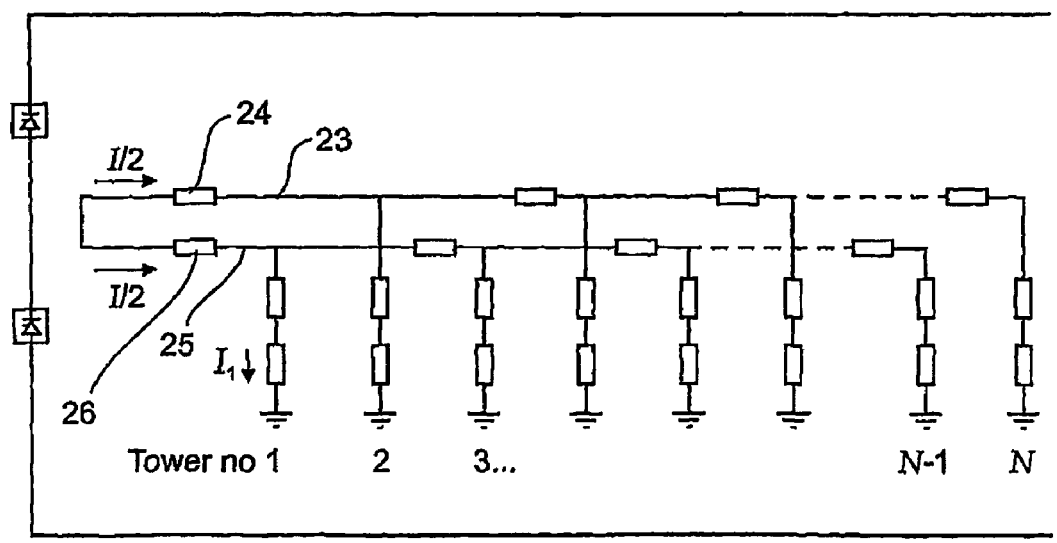
FIG. 4 is a principal circuit of a land electrode comprising a plurality of electrode sections and a line electrode in a two branches connection.

The line electrode may also be connected to the grounding point of the converter station in a midpoint arrangement with a feeder line 21 having a feeder resistance 22 as shown in FIG. 3. A further connection arrangement is shown in FIG. 4, where the line electrode is connected as two parallel branches. The electrode consists of a first branch 23 having a first branch resistance 24 and a second branch 25 having a second branch resistance 26. The first branch is connected to every second electrode section and the second branch is connected to the remaining electrode sections. The main advantage is that the current balance between the two branches may be measured in the converter station which facilitates an earth fault detection. Furthermore, the current distribution is improved in the same way as for the scheme with midpoint supply. Every second tuning resistor is connected to one of the electrode wires. The remaining tuning resistors are connected to the other. By this the electrode consists of two equal branches. The main advantage is that the current balance between the two branches can be measured in the converter station which facilitates an earth fault detection. Furthermore, the current distribution is improved in the same way as for the scheme with midpoint supply.

One line electrode may comprise about 250 towers of the HVDC-line in case of a rated electrode current of 3000 A. Balanced bipolar operation should be used whenever both pole lines and both converter poles are available. If one of the converter poles should be unavailable metallic operation should be applied as fast as possible and maintained until the fault has been cured. Only after failing to maintain the voltage of one line monopole operation of prolonged duration (about one day) will occur.

The technical advantages are:
  Significantly reduced electric earth surface potential at a distance up to 50-100 km from the electrode, compared to conventional electrodes
  Reduced risk for leakage currents in transformers and infrastructure
  No separate electrode site is required, the right of way of the DC line is utilized Tower foot earthings of common design, with earth wires made of copper, may be used as electrode elements Some auxiliary equipment and reinforcement of the line design is required. Reinforced wire(s), with sufficient cross section area, on the HVDC line may be used for connecting the electrode to the converter station. One or two conductors are required depending on the electrode scheme. The wire(s) may be insulated with a single glass, porcelain or composite insulator unit.

Earth fault detection and protective measures by control action in the converter station may be introduced to minimize the risk of damages and danger in case of earth fault. An earth fault detection may be based on measurement of unbalance current in an electrode scheme with two equal electrode branches, and/or resistance measurement. Application of surge arresters on the shield wire in each tower, in addition to the earth fault detection, would reduce the number of earth faults and increase the reliability of the electrode protection.

The electrode should be designed to avoid even short term currents in adjacent AC and converter transformers which require a low electric field at the surface of the earth and a low earth potential rise. To attain low surface voltages a sufficiently long line electrode is required. Corrosion caused by the very small unbalance current during normal bipolar operation over long time has to be considered. As the electrode will only operate very seldom and during short intervals with full current, typically one day, corrosion caused during monopole operation is a small issue. Touch and step voltages at the towers of the line electrode should be below permissible values. The electrode should be provided with earth fault detection/protection.

According to the invention the DC line is used as an electrode. This could be done by isolating the ground wires and reinforce them to carry the full direct current. At each tower a certain current is injected into ground via tuning resistors. By doing this the electrode may be made very long, typically about 100 km. This is favorable compared to conventional electrodes that are normally circular with a diameter of maximum 1000 m. A line electrode may be utilized at one or both ends of the HVDC transmission link.

The towers from the converter station to the far end of the line electrode need short insulators for the electrode wire(s). Towers of the line electrode have a tuning resistor connected to the electrode wire(s) to attain an even current distribution. This resistor may preferably be placed near the electrode wires. By this the cable from the resistor down to the tower foot earthing needs no (or very low) insulation. The tower foot earthing serves as a sub electrode of the line electrode. The tower foot earthing is of common type, consisting of e.g. radial counterpoises or continuous counterpoise. However, the total cross section area of the earth wires may be increased considering the additional DC related corrosion, which is small but not negligible over long time. Grading rings at the tower foot should be included if required.

Reinforced electrode wire(s) of the HVDC line is utilized for connection of the line electrode to the neutral bus of the HVDC converter. The wires have to be insulated at each tower from the station to the far end of the line electrode. The wire(s) may also include optical fibers for communication. A low resistance of the shield wires through the line electrode contributes to an even current distribution between the sub-electrodes. The resistance between the converter station and the supply point of the electrode has no influence on the current distribution, however, power losses increase with resistance.

Ordinary OPGW (OPtical Ground Wire) has a too low loading capability to carry the rated current (3000 A). For example the maximum continuous load of the OPGW of largest cross section from ALCATEL is 763 A. Instead two OPPC (OPtical Phase Conductor) may be used. For example 946 mm2 AAAC (Al/Al Alloy Conductor), rated for 1766 A each.

For an optical phase conductor, 946 mm2 (Lumpi) the DC resistance of this conductor is 0.0356 Ω/km. The resulting resistance between adjacent towers in the line electrode would be 0.00712 Ω (span length 400 m). Other solutions, however, without an optical cable are possible. A low resistance improves the current distribution in the line electrode. An alternative is therefore to utilize, at least within the electrode part of the line, two shield wires of great cross section to attain a low resistance. For example Jorea ACSR1, 1274 mm2 with 0.0226 Ω/km. A cross connection between the two conductors at every tower results in this case in a resistance of 0.00453 Ω between adjacent towers.

Although favorable the scope of the invention must not be limited by the embodiments presented but contain also embodiments obvious to a person skilled in the art. For instance the line electrode may equally comprise an insulated cable in the ground. Also the electrode elements may be of ordinary design and positioned between the towers. In a development of the invention the shield wires may be used for line electrodes.

The invention claimed is:

1. A land electrode for a high voltage direct current transmission system having a converter station with grounding point, the land electrode being connected to the grounding point and comprising:
    a plurality of electrode sections, each electrode section comprising at least one electrode element; and
    a line electrode, wherein a part of the line electrode interconnecting two electrode sections exhibits a line resistance, and wherein each electrode section comprises a tuning resistor configured to connect the electrode section to the line electrode.

2. The land electrode according to claim 1, wherein the line electrode is connected at one end to the grounding point.

3. The land electrode according to claim 1, further comprising:
    a feeder conductor configured to connect a mid point of the line electrode to the grounding point.

4. The land electrode according to claim 1, further comprising:
    a first branch connected to every second electrode section and
    a second branch connected to remaining electrode sections.

5. The land electrode according to claim 1, further comprising:
    a line tower including a tuning resistor and the electrode element.

6. The land electrode according to claim 5, wherein the electrode element comprises a tower grounding.

7. A land electrode according to claim 5, further comprising:
    a wire suspended by isolators in the tower.

8. The land electrode according to claim 5, further comprising:
    a shielding wire which also serves as thunder lightening protection.

9. A method for grounding a high voltage direct current transmission system comprising a plurality of electrode sections each including at least one electrode element, the method comprising:

providing in each electrode section a tuning resistor, connecting the electrode sections to a line electrode so that a part of the line electrode interconnecting two electrode sections exhibits a line resistance, and tuning the tuning resistor to equal current flow for each section.

10. The method according to claim 9, further comprising:
providing the line electrode with a decreasing conducting area between each section connection in a direction away from the grounding point.

* * * * *